Dec. 24, 1968  W. F. BREWER  3,417,557
CUTTING ASSEMBLY FOR FLAIL TYPE MOWER
Filed July 2, 1965
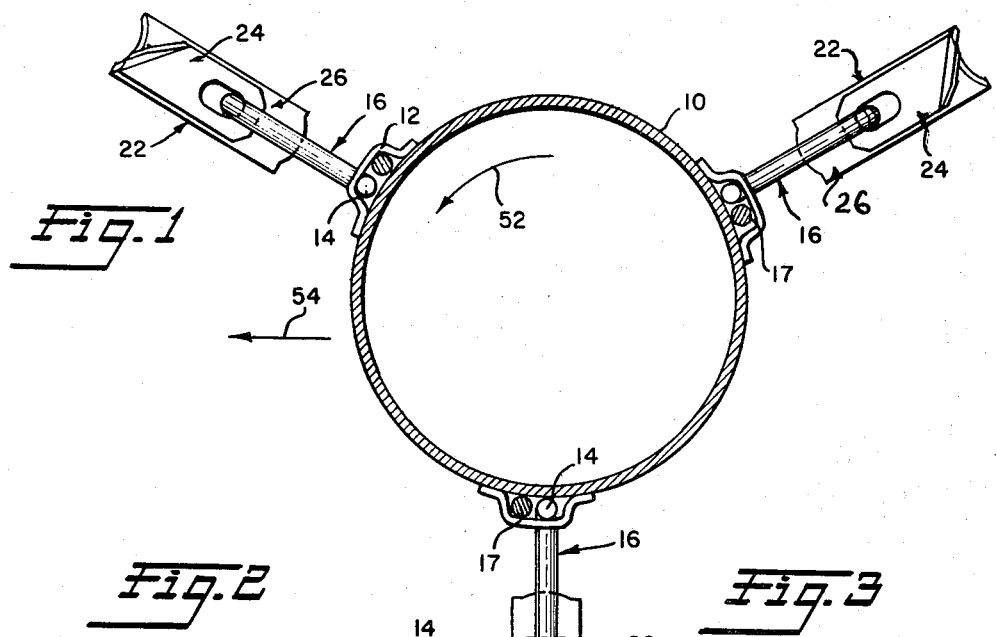
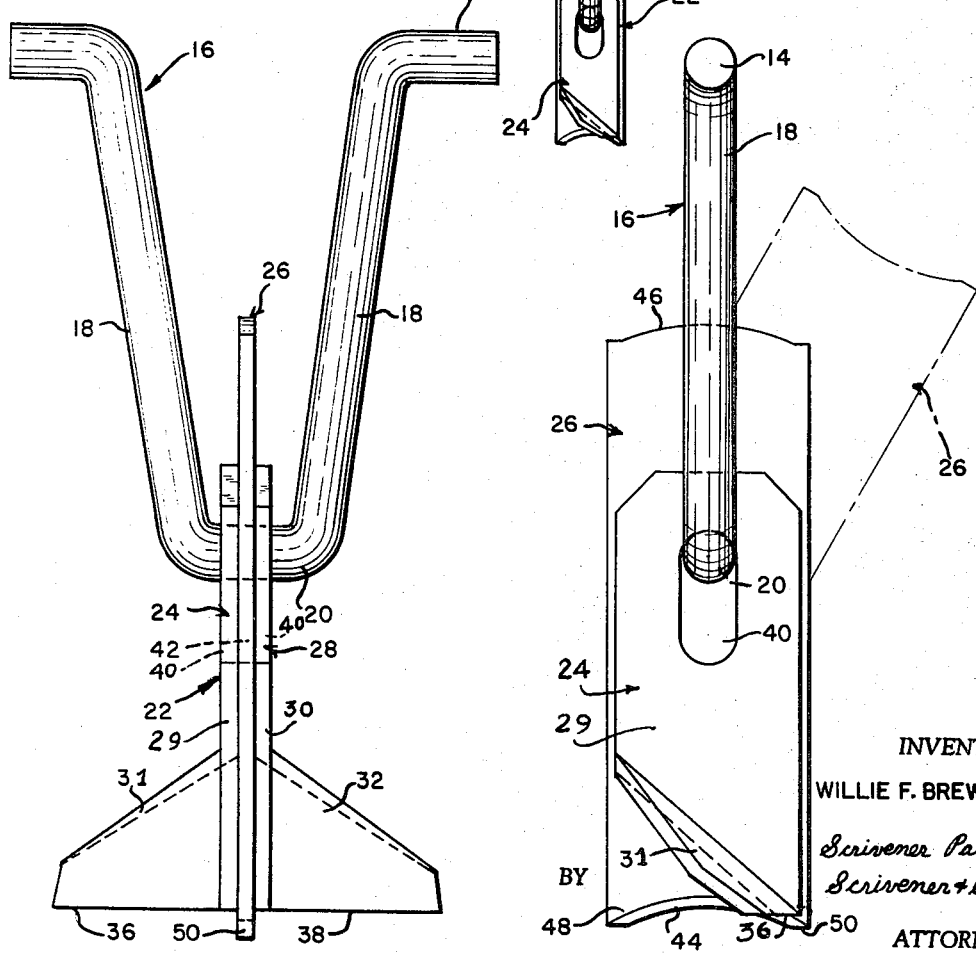
INVENTOR
WILLIE F. BREWER
BY Scrivener Parker
Scrivener & Clarke
ATTORNEYS

United States Patent Office 3,417,557
Patented Dec. 24, 1968

3,417,557
CUTTING ASSEMBLY FOR FLAIL TYPE MOWER
Willie F. Brewer, Minden, La., assignor, by mesne assignments, to FMC Corporation, San Jose, Calif., a corporation of Delaware
Filed July 2, 1965, Ser. No. 469,241
5 Claims. (Cl. 56—294)

ABSTRACT OF THE DISCLOSURE

For use in a flail type mower, a cutter assembly comprising a pair of mowing blades having a thatching blade of continuous flat sheet material mounted between the mowing blades with a cutting edge in the plane of the blade and extending below the mowing blades for the purpose of cutting thatched over vegetation not reachable by the mowing blades; in addition, the thatching blade has a part extending radially inwardly from its mounting opening, the purpose of the inwardly extending part being to partially counter balance the outwardly extending part of the thatcher blade whereby the latter is readily oscillatable so that the outwardly and inwardly extending parts are continuously swept between the mowing blades and between the elongated legs of a hanger member, respectively, to maintain said hanger member, mowing blades and cutter assembly free of vegetation which might otherwise be caught and retained on the assembly through centrifugal force.

---

This invention relates to flail type mowers and more particularly to an improved cutter assembly for a flail type mower.

Flail type mowers are well-known and comprise generally a plurality of flail type cutting elements pivotally connected to the exterior of a cylindrical drum which is rotated at a relatively high rate of speed to move the cutting edges of the elements against vegetation with sufficient impact to insure cutting. The cutting elements are staggered on the drum in such a way as to cover all vegetation in the path of the drum and it is desirable, and in many instances essential, as for example, in the case of golf courses, that the vegetation be cut smoothly across the entire transverse width of the cutter.

In order to insure uniform height of cut ideally the cutting edges should extend along horizontal lines parallel to the axis of the drum, that is to say, the cutting edges should be at right angles to the shanks of the elements but this arrangement creates certain difficulties in that cut grass can be retained by centrifugal force on the horizontal cutting parts of the cutter elements, and the prior art has recognized this problem and has provided a solution by arranging that the right angular cutting surfaces are at the leading edge of upwardly and rearwardly sloping parts which are bent out from the shank parts and provide a ramp-like structure along which the vegetation is moved by centrifugal force without hanging up on the cutting parts as above mentioned. Such an arrangement is shown in the patent to Frevik et al., No. 3,122,871, but the Frevik cutters are subject to certain disadvantages in that it has been found that cut vegetation is picked up by the U-shaped hanger members which serve to pivotally connect the elements to the drum and when grass or other vegetation hangs up in the hanger elements it is retained there by centrifugal force and it frequently accumulates to such an extent that it extends in front of the cutting edges of the elements so that their cutting efficiency is greatly reduced and often no cutting at all can take place, so that ragged islands of uncut grass remain after the mower has traversed the area being mowed.

Furthermore, with cutters of the Frevik type where vegetation is flattened or has been mashed down, as, for example, by tractor wheels as often occurs along the sides of the cut swath, the bent over grass is not reached by the cutting elements and thus is not cut and upon the completion of mowing the uncut grass or other vegetation eventually springs back up and presents a sloppy appearance.

The broad object of the present invention is to provide for a flail type mower, cutter elements of the right angular variety as above defined, which overcome the disadvantages of present right-angular type cutters.

More particularly, it is the object of the present invention to provide a cutter assembly for a flail type mower which is composed of a plurality of separable parts and includes means whereby the U-shaped hanger elements are continually and automatically swept clear of accumulated vegetation and also includes means whereby thatched down or bent over vegetation is subjected to cutting action to the same extent as is free standing vegetation.

Other objects and their attendant advantages will become apparent as the following detailed description is read in conjunction with the accompanying drawings wherein:

FIG. 1 is a vertical cross-sectional view of the blade carrier showing cutting elements constructed in accordance with the invention as they appear when the carrier is rotating at cutting speed;

FIG. 2 is an enlarged front elevational view of a hanger and a cutter element constructed in accordance with the invention; and FIG. 3 is a side elevational view of the hanger and element illustrated in FIG. 2.

With reference to the drawings and particularly FIG. 1 thereof, the numeral 10 designates a mower drum which may have fixed to the outer surface thereof, as by welding or the like, a plurality of longitudinal channel members 12 which are slotted at spaced intervals to receive the outwardly extending arms 14 of hanger elements 16 which are pivotally locked in place by means of elongated locking rods 17. Each rod 17 is movable longitudinally with respect to its channel member 12 until each is clear of arms of a selected hanger whereupon the hanger may be moved laterally in the channel member into registry with enlarged slots and thus removed from the drum. For a detailed description of the locking arrangement illustrated in FIG. 1, reference is made to the application of Willie F. Brewer, Ser. No. 458,838 filed May 20, 1965, now Patent No. 3,252,276, and assigned to the same assignee as the present invention.

Referring now to FIGS. 2 and 3, each hanger element 16 is U-shaped to provide a pair of legs 18 whose upper ends are bent outwardly to provide the arms 14 and whose lower ends are joined together by an integral horizontal bight part 20 which serves to pivotally support a cutter assembly constructed in accordance with the invention and broadly designated by the numeral 22.

Each cutter assembly of the invention is composed of three members 24, 26, 28 which are movable independently of each other on the hanger 16. The side members 24, 28 comprise shank 29, 30 having at their respective lower ends outturned cutting parts 31, 32 which are upwardly and forwardly sloping as clearly shown in FIG. 3 with their loading or rear lower edges defining horizontal cutting edges 36, 38. Each of the members 24, 28 is pivotally received on the horizontal bight 20 of the hanger through the medium of slotted or elongated openings 40 and sandwiched between the members 24, 28 is the third member 26 of the cutter assembly of the invention. This member comprises a flat substantially rectangular plate which is also swingably mounted on the bight 20 of the hanger through the medium of an elongated slot 42 with the latter being of a size and so positioned in the member 26 that a somewhat greater portion of the member 26 lies between the lower end of the slot and the bottom edge 44 of the member 26 than between the upper end of the slot and the upper edge 46 whereby the member 26 through gravity and/or centrifugal force, while being readily rotatable with respect to the side members 24, 28 tends to seek the position of FIG. 3 of the drawings with its lower edge 44, or at least the outer corners 48, 50 extending below the cutting edges 36, 38 of the side members 24, 28. Desirably, the lower edge 44 of the member 26 between the corners 48, 50 is arcuately recessed in order that the corners 48, 50 clearly define cutting points which will engage packed, bent down or thatched over vegetation with minimum tendency for the member 26 to be pushed upwardly in engagement of the center part of the lower edge 44 with vegetation, which might be the case were the edge 44 to be perfectly straight between the corners 48, 50.

In operation, the drum 10 of FIG. 1 is rotated at a high rate of speed counterclockwise in the direction of the arrow 52 while at the same time the apparatus is moved across the area to be mowed in the direction of the arrow 54, it being understood that the mowing equipment would, in operation, be attached to and driven from a tractor vehicle in a manner well recognized by those skilled in the art. During mowing operations, the cutting edges 36, 38 of the cutter elements are moved with an impact action rearwardly against the vegetation with the cuttings being thrown upwardly and rearwardly of the equipment by the rapidly moving elements. Should either of the side cutter members 24, 28 engage an uncutable obstruction the member may be swung to one side away from the other two members and at the same time that member may be pushed radially inwardly, as would be permitted by the slots, in order that the obstruction may be cleared with a minimum of stress on the member. Obviously, the foregoing action applies equally to all of the members making up the cutter element of the invention.

As previously mentioned, as the apparatus traverses terrain wherein the vegetation is thatched down or bent over or comprises tangled vines and thus is not readily reached for cutting by the cutting edges 36, 38 of the side members, the sharp corners 48, 50 of the center thatching blade 26 engage the bent over vegetation and cut the same.

In addition to serving as a thatching blade the center member 26, because of the extra mass above its normal pivot point, is not retained by centrifugal force in the position of FIG. 2 with the same effort as the side members 24, 28; that is to say, though the members 26 will tend to remain in the position of FIG. 2 because of its greater mass below its pivot as above mentioned, it nevertheless is rockable relatively easily with respect to the side members and it is this ability which affords an important feature of the invention in that the constant rotary or rocking movement of the center member 26 to at least the phantom line position of FIG. 3, causes the upper end of the center blade 26 to constantly sweep through and clear from the hanger bight any vegetation which tends to be caught up in the hanger and be there held by centrifugal force. Experimentation has established that with the rockable thatching blade of the invention even when mowing tangled and dense growth, particularly vines, no vegetation whatever is retained in the hangers, whereas with unitary cutter elements of the right angular variety, the hangers invariably become clogged and thus limit the use of prior flail type cutters to areas of relatively mild growth, for example, to the maintenance of lawns, fairways and the like.

Those skilled in the art will recognize that the invention is susceptible of modification and changes without, however, departing from the scope and spirit of the appended claims.

What is claimed is:

1. In combination with a pair of side-by-side independently swingable mower blades each having a flat shank portion, a mounting opening adjacent one end of the shank portion, and a cutting portion integral with the other end of the shank portion, the cutting portions of the respective blades extending angularly away from each other out of the planes of the shank portions, a thatcher blade between the shank portions of said mower blades, and comprising an elongated flat body of sheet material, a cutting edge formed on one end of said flat body and lying in the plane thereof, and a mounting opening through said body and spaced inwardly from said cutting edge a distance such that when said thatching blade is mounted in its position of use between a pair of mower blades its cutting edge extends radially outwardly beyond the cutting portions of said mower blades in order to sever thatched-over vegetation not reachable by the cutting portions of said mower blades.

2. The combination of claim 1 wherein the flat body of said thatching blade is of substantially rectangular configuration, said body including a part extending radially inwardly with respect to said opening, the mass of said inwardly extending part being less than that part of the body extending radially outwardly with respect to said opening, said inwardly extending part partially counterbalancing the outwardly extending part whereby said thatching blade is readily oscillatable about the axis of said opening while said cutting edge is retained in substantially radial cutting position by centrifugal force acting on the larger mass of the outwardly extending part of said body.

3. The combination of claim 2 wherein said opening is of elongated, slot-like configuration.

4. The combination of claim 2 including in addition a hanger member comprising a body part of generally U-shaped configuration defining a closed bight swingably receiving the openings of said thatching blade and said mower blades, a pair of legs extending radially inwardly of said bight and means at the inner end of said legs for swingably attaching said hanger member to a horizontal carrier of a flail type mower, said legs having a length at least greater than the length of the radially inwardly extending part of said thatching blade whereby said part is capable of a clear sweep through said legs for maintaining said hanger means free of vegetation during cutting operations.

5. The combination of claim 1 wherein the cutting portions of each of said mower blades extends outwardly at substantially right angles to the shank portions, each of said cutting portions being flat and extending upwardly and forwardly with respect to said shank portion, the lower rear edge of each of said cutting portions defining a cutting edge.

References Cited
UNITED STATES PATENTS

| | | | |
|---|---|---|---|
| 2,941,347 | 6/1960 | Strom | 56—294 |
| 3,093,951 | 6/1963 | Barows et al. | 56—294 |
| 3,122,871 | 3/1964 | Frevik et al. | 56—294 |
| 3,177,640 | 4/1965 | Mott. | |

ANTONIO F. GUIDA, *Primary Examiner.*